3,129,092
METHOD FOR PRODUCING GRANULATED CALCIUM SUPERPHOSPHATE

Casimer C. Legal, Jr., Elkridge, and James A. Long, Jr., Baltimore, Md., assignors to W. R. Grace & Co., New York, N.Y., a corporation of Connecticut
No Drawing. Filed July 17, 1961, Ser. No. 125,043
5 Claims. (Cl. 71—64)

This invention relates to the manufacture of phosphatic fertilizers, and more specifically to an improved method for granulating phosphatic fertilizers into a commercially acceptable form.

In the processing of phosphatic fertilizers such as normal superphosphate and triple superphosphate to obtain granular or pelletized types of products it has heretofore been the practice to (1) form a dampened mass of reacted phosphatic material; (2) tumble or agitate the dampened mass along with certain amounts of previously dried recycle material; and (3) dry the granules formed during the tumbling operation. The addition of the recycle material during the tumbling serves both to form nuclei upon which granules may form and to reduce the fluid proportion of the slurry so that agglomeration and granulation may take place. After the material has been granulated it is then subjected to a drying procedure wherein the fluid content of the granules is reduced to an acceptable level. During this drying operation, the duration of which depends primarily on the amount of slurry forming liquid (usually water) which has been added initially, the granules are tumbled vigorously and subjected to substantial mechanical forces as well as heat. The post-granulation drying step is expensive and time-consuming. It is often found in many granulation operations presently in commercial use the output of on size granules may be less than 10% of material input.

Further difficulties attending most prior art slurry granulation processes involve the preparing and handling of large quantities of damp semi-slurried material which due to its sticky and gummy physical state is very apt to clog processing equipment and is generally hard to handle.

It is therefore an object of the present invention to provide an improved method for granulating phosphatic fertilizer.

It is another object of the present invention to provide a method for granulating phosphatic fertilizers wherein auxiliary fluid addition and slurry formation is not required.

It is still a further object to provide a method for producing a commercially acceptable dry granulated phosphatic fertilizer in which no post-granulating drying operation is required.

It is yet another object to provide a phosphatic fertilizer granulation method which requires a minimum amount of recycle material and hence provides a high specific output of granulated material.

It is yet another object to provide a granulation method which may be effectively applied to a variety of phosphatic based fertilizer.

These and still further objects of the present invention will become readily apparent to one skilled in the art from the following detailed description and specific examples.

Broadly, the present invention contemplates a method for economically and conveniently producing granulated fertilizers which involves the vigorous admixing of a freshly prepared phosphate fertilizer with a minor portion of "cured," i.e., substantially hydrated fertilizer for a controlled period of time.

More specifically, we have made the surprising discovery that if a freshly prepared phosphatic fertilizer having a moisture content of from about 5 to 15% is taken from its reaction vessel and directly admixed with from about 10 to about 100% (i.e., 0.1 to 1.0 part) and preferably 10 to 50% by weight of a cured phosphatic fertilizer having a moisture content of from about 2 to 8% by weight under vigorous mixing conditions, a large yield of granulated material may be easily obtained. The duration or mixing period will depend to some extent upon the type of apparatus used, the particle or granule density desired, as well as the intensity with which the particles are agitated.

In general, the longer the mixture is agitated the denser the granules or pellets become. Extending the mixing period in a given apparatus will also yield particles having larger diameters, however, the size of the granule obtained is primarily dependent on the proportion of cured, substantially hydrated recycle material which is used. If, for example, one attempted to granulate 100% uncured or freshly reacted phosphate material it would be found that large "mud balls" would be obtained. On the other hand, if 100% cured material, i.e., recycle material was treated, a dusty particulate material would result with no accompanying granulation. The obtaining of granule of a desired size range, usually 6 to 30 U.S. mesh, requires that the weight ratio of a cured to fresh material be maintained in the range of from about 0.1 to about 1.0. The precise ratio chosen within the size range will depend on the nature of the materials being treated. Factors such as the actual free moisture content; the degree of hydration; the chemical composition; and so forth of the materials processed all govern to some degree the exact processing conditions chosen.

Generally speaking, any conventional mixing apparatus may be used to carry out the presently intended granulation process, provided the apparatus is supplied with sufficient power to cause a thorough inner mingling of the fertilizer particles. The time required for a mixer to produce granulation will depend to some extent upon the configuration of the mixer, the speed at which the mixer is operated, the composition of the input material, and so forth. In general granulation takes place within one hour of agitation and may take place as rapidly as 30 seconds. A preferred type of mixer is the conventional twin shaft horizontal pug mill which it is found may be precisely controlled to give the desired amount and type of mixing required. Using a standard pug mill, it is generally found that a mixing time of from about 1 to 8 minutes yields a commercially acceptable product having about 60 to 80% of its granules in the 6 to 30 U.S. mesh size range.

The phosphatic fertilizers granulated in accordance with the present invention include conventional normal superphosphate which contains 16 to 22% $P_2O_5$ and triple superphosphate containing 45 to 50% $P_2O_5$. These "superphosphate" products may be produced by any of the conventionally known processes which include the "mixer and den" process, i.e., batch method, or the "TVA cone and belt" method, i.e., continuous processing method.

The exact reason why cured fertilizers produce a pelletizing or granulating effect on freshly reacted fertilizer material is not entirely understood. However, it is believed the phenomenon is related in some way to the manner in which the water contained in the two respective products is chemically or physically combined therewith and possibly the free acid content of the fresh material. In the case of the cured product it is generally known that a large portion of the water content is chemically bound with the phosphates therein as water of hydration; and the free acid is relatively low; whereas in the case of the freshly reacted material, the water content thereof is substantially in the non-combined or "free"

state and free acid is relatively high. One may then reason that in a case of the cured fertilizer the water of hydration and free acid are generally not available to take part in granule formation, whereas that of the fresh material is available. Hence, it appears the granulation phenomenon may be interrelated with the hydrated-free water ratio of the combined products and to the free acid content thereof.

The cured material used in the present invention is most conveniently obtained by storing a reacted phosphate fertilizer under atmospheric conditions for a period of two to three weeks during which hydration of the fertilizer takes place. During this period moisture content usually falls from the original 5 to 15% to about 2 to 8% and the free acid content is reduced from about 16 to 24% down to about 2 to 4%. This aged or cured product is known to those engaged in the industry as "run-of-pile" phosphate and is known to have high porosity and large surface area which renders it particularly susceptible to subsequent ammoniation treatments.

Having broadly described the essential elements of the present invention the following specific examples are given to provide detailed embodiments thereof.

*Example I*

To obtain freshly reacted triple superphosphate, 1700 g. of the phosphoric acid having a $P_2O_5$ content of 53.5% was intimately mixed with 1,040 g. of phosphate rock containing 34.2% of $P_2O_5$. The mixer used was a double bladed type having a planetary action. The mixing time was approximately 30 seconds. After the mixing was completed the mixture was allowed to stand for about 15 minutes which corresponds to normal commercial plant practice. After this time, the material had hardened to a considerable extent and was easily reduced to a particulate mass without difficulty. A total of four such batches were prepared to give a freshly reacted sample of approximately 24 pounds in weight. This fresh material, along with 6 pounds of well cured (three weeks curing under atmospheric conditions) pulverized triple superphosphate, was then passed through a small twin shaft pug mixer at a rate which provided a dwell-time of the material in the mixer of about 1½ minutes. The particle size analysis of the product obtained by the above process showed that up to 70% of the product was in the desired particle size range of 6-30 mesh. On curing the granules produced were sufficiently hard to withstand normal handling under commercial conditions without excess degradation of particle size. Chemical analysis of the product after aging and curing for three days under atmospheric conditions was as follows: Moisture—5.92%; total $P_2O_5$ content—48.8%; citrate insoluble in $P_2O_5$—0.96%; citrate available in $P_2O_5$—47.84%; and free acid—4.76%; wherein all percentages are given by weight.

*Example II*

1000 pounds of fresh normal superphosphate was added continuously to a large pug mill mixed at a rate of 25 pounds per minute at the same time, cured normal superphosphate (30 days at 140° F.) was added at a rate of 25 pounds per minute. A granulated product resulted which contained 65% of the desired particle size namely 6-30 mesh.

After processing, the granules produced were sufficiently hard to withstand normal commercial handling without degradation of particle size.

*Example III*

Five tons of triple superphosphate was prepared by a batch process. This freshly reacted material had a moisture content of 9.5% and after one hour setting time possessed a crumbly texture. The fresh superphosphate was reduced to a pulverent state and passed through a twin blade pug mill along with 0.5 part by weight of cured (6 weeks under atmospheric conditions, moisture content of 3.5%) pulverized triple superphosphate. The rate of feed to the mixer of the combined materials was one ton per hour which gave a residence time of the material in the mixer of about 2.5 minutes. Screening of the resultant material indicates a product was obtained which possessed 72% of the particles in the 6-30 U.S. mesh size range.

It is found that the normal and triple superphosphate obtained in the practice of the present invention may be conveniently ammoniated to the extent of about 2.5 to 5 pounds of $NH_3$ per pound of $P_2O_5$ in the granulated fertilizer. This figure represents a susceptibility to ammoniation which is up to four times that of superphosphate granulated in the conventional manner. This susceptibility to ammoniation is attributed to the fact that by granulating as set forth herein, a granule may be obtained which has a density considerably lower than that obtained in the prior art granulation processes. This lower density represents a product having considerably more porosity and hence higher absorption capabilities than the more dense granulated slurries.

We claim:
1. A method for granulating phosphatic fertilizers which comprises combining from about 0.1 to about 1.0 part by weight of substantially hydrated phosphatic fertilizer having a moisture content of from about 2 to about 8% by weight and a free acid content of from 2 to 4% by weight with about 1.0 parts by weight of said fertilizer in a non-hydrated form having a moisture content from about 5 to about 15% by weight and a free acid content of from 16 to 24% by weight, and agitating said combined fertilizer for a time sufficient to cause granulation thereof.

2. A method for granulating phosphatic fertilizers which comprises combining from about 10 to about 50 parts by weight of a substantially hydrated phosphatic fertilizer having a moisture content of from about 2 to about 8% by weight and a free acid content of from 2 to 4% by weight with from about 50 to about 90 parts by weight of said fertilizer in a non-hydrated form having a moisture content of from about 5 to about 15% by weight and a free acid content of from 16 to 24% by weight, and agitating said combined fertilizers for a time sufficient to cause granulation thereof.

3. The method of claim 2 wherein the combined fertilizers are agitated for a period of from about 1 to about 8 minutes.

4. A method for granulating phosphatic fertilizers which comprises combining from about 10 to about 50 parts by weight of a substantially hydrated phosphatic fertilizer having a moisture content of from about 2 to about 8% by weight and a free acid content of from 2 to 4% by weight with from about 50 to about 90 parts by weight of said fertilizer in a non-hydrated form having a moisture content of from about 5 to about 15% by weight and a free acid content of from 16 to 24% by weight, agitating said combined fertilizers for a period of from about 1 to 8 minutes to cause granulation thereof, pile curing and then screening the granulated fertilizer to segregate the granules having a mesh size of from about 5 to 30 U.S. mesh, treating the outsized materials by grinding to obtain a material having a particle size of less than 10 U.S. mesh, and recycling the ground material to the granulating process.

5. The process of claim 1 wherein the phosphatic fertilizer is selected from the group consisting of normal superphosphate, triple superphosphate, and mixtures thereof.

References Cited in the file of this patent
UNITED STATES PATENTS

| | | |
|---|---|---|
| 2,136,793 | Gabeler et al. | Nov. 15, 1938 |
| 2,287,759 | Hardesty et al. | June 23, 1942 |
| 2,448,126 | Shoeld | Aug. 31, 1948 |
| 2,739,886 | Facer | Mar. 27, 1956 |